Aug. 1, 1950　　　　J. R. MANNING　　　　2,516,896
WHEEL STRUCTURE
Filed Nov. 19, 1945

INVENTOR.
John R. Manning
BY
Fishburn & Mullendore
ATTORNEYS.

Patented Aug. 1, 1950

2,516,896

UNITED STATES PATENT OFFICE 2,516,896

WHEEL STRUCTURE

John R. Manning, Kimball, Nebr., assignor of one-half to Sue M. Winston, Roswell, N. Mex.

Application November 19, 1945, Serial No. 629,541

5 Claims. (Cl. 301—36)

1

This invention relates to a wheel structure and more particularly to a load supporting ring member for use with single or dual wheel structures.

The present invention is an improvement over Patent No. 2,288,474.

The principal objects of the present invention are to provide for facilitating mounting of the wheel structure on an axle and to support the load with respect to the hub of such wheel structure; to provide for locking the wheel structure relative to its mounting; to provide a double beveled or tapered ring member for supporting the load with respect to the wheel structure; to provide a ring plate member for reinforcing the wheel structure for use on either dual or single wheel assemblies; to provide means for strengthening the structure against radial or lateral stresses; and to provide a convenient, relatively ecomonical and highly efficient wheel structure for the purposes noted.

In accomplishing these and other objects of the present invention, I have provided improved details of structure, the preferred form of which is illustrated in the accompanying drawings wherein.

Figure 1:
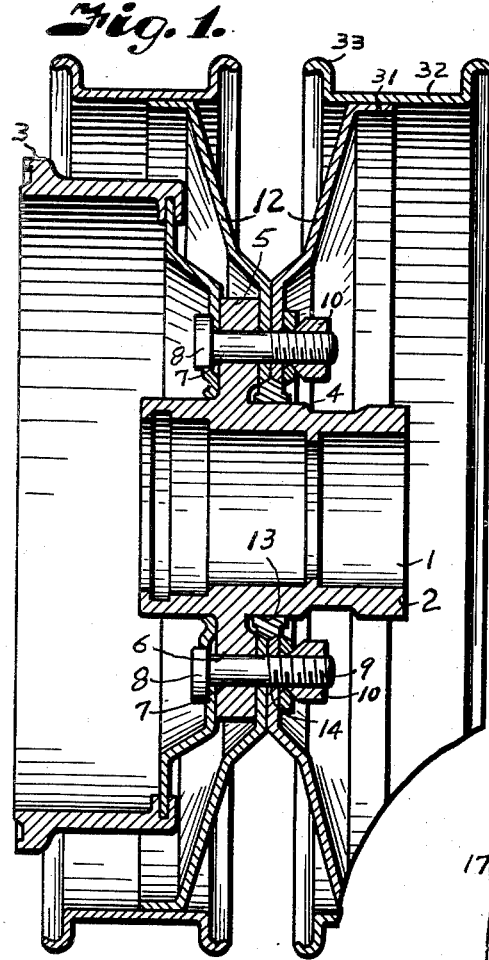
Fig. 1 is a vertical cross section through the wheel structure embodying the features of the present invention showing its relation to a support therefor.

Referring more in detail to the drawings:

1 designates a housing for a conventional automotive vehicle axle for supporting a hub 2, the axle preferably being connected with the hub by the usual means, such as a cap or the like for driving the hub (not shown). A conventional brake drum housing 3 is provided with the usual braking shoes operated by a conventional hydraulic mechanism as in usual practice (not shown) forming no part of the present invention.

The hub 2 is preferably provided with an annular shoulder 4 having an annular outwardly extending flange 5 provided with spaced apertures 6 for fastening devices 7, such as the bolts shown, the bolts being provided with heads 8 and

2 threaded opposite ends 9 to receive nuts 10 that are preferably provided with tapered inner ends 11.

While the present wheel structure may be of single type as will later appear, it is shown for convenience of illustration to be of dual type, the wheel structure preferably consisting of a body member 12 having a central axial opening 13 that fits about the hub 2 and is of approximately the diameter of the hub. The body member is also preferably provided with spaced apertures 14 of a number equal to the apertures 6 in the hub flange 5. Where the dual type wheel structure is employed, the second or outer wheel is preferably a duplicate of the first or inner wheel.

Figure 3:
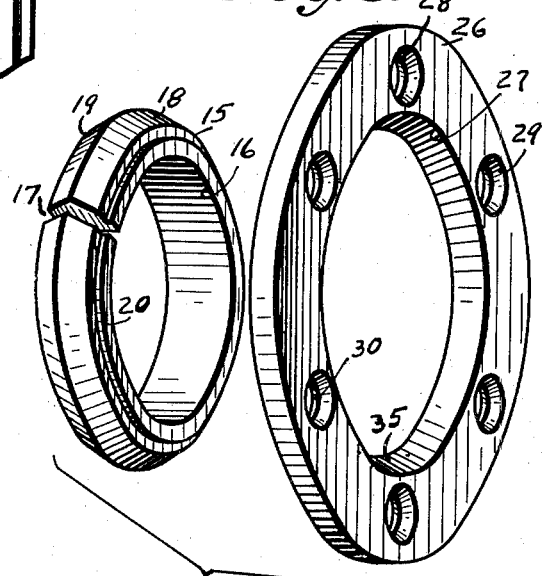
Fig. 3 is a detailed perspective view of the load supporting member and the locking plate shown in disassembled relation.

15 (Fig. 3) designates a ring adapted for employment in dual type wheel structures in accordance with the present invention, the ring having a central aperture 16, and is split transversely as indicated at 17. The aperture fits snugly about the hub 2 and the outer circumference is beveled to provide faces 18 and 19 for a purpose later described. The respective sides of the ring are provided with annular shoulders 20 and 21.

Figure 2:
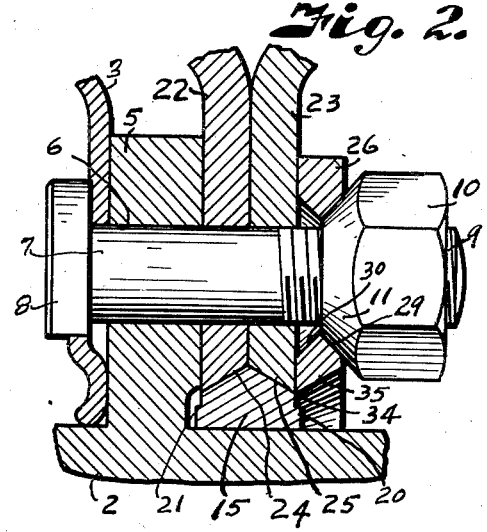
Fig. 2 is a vertical cross section through a portion of the wheel structure adjacent its axis to more clearly illustrate the arrangement of mounting the wheel structure on a support.

Formed integrally with the body members 12 of the wheel structure are disks 22 and 23 having their lower ends beveled as indicated at 24 and 25 (Fig. 2) forming substantially a V-shaped face when the disks are in mating relation. The beveled faces 18 and 19 of the ring 15 are adapted to engage the beveled faces 24 and 25 of the disks to support the load between the hub and wheel structure. When the wheel is assembled the tapered sleeve or ring contracts the weight support sleeve into load supporting engagement, thereby taking the radial and lateral strains as well as weight from the wheel and hub bolts proper, thus leaving them subjected to only partial torsional strains. The ring being split will afford tight engagement between the ring and disks at all times.

26 designates a plate substantially of ring shape and having a central aperture 27 of a size to be spaced from the hub 2 when the plate is inserted therearound. The plate is adapted to engage against the disk 23 (Fig. 2) to aid in reinforcing the wheel structure at the hub mounting zone which is the weakest point of such structure. The plate ring 26 is also provided with a series of spaced apertures 28 and has bevels forming conical seats 29 and 30 on the respective sides of the apertures adapted to engage the tapered face 11 of the nut 10 when the device is in assembled relation.

The wheel structure body member 12 projects radially outwardly from the central axial portion thereof and terminates in a laterally turned flange 31 that may be secured by welding or the like to a rim portion 32 having a suitable bead 33 for mounting the supporting flanges of a pneumatic or like tire (not shown).

With the device assembled on dual wheels as above described, the split ring 15 engages the disks of the wheel structure body members to support the load thereon, and the V-shaped beveled faces of the disk engage the beveled faces of the ring so that the members are held in place and the plate ring 26 engages the disk 23 and merely contacts the split ring at the outside beveled edge as indicated at 34. The tapered inner face 11 of the nut 10 of the bolt engages in the beveled apertures 29 of the plate ring to hold the load supporting ring member in engagement with the disks.

The operation of a wheel structure constructed as described is as follows.

A single wheel structure may be applied to the hub 2 whereupon the ring 15 is applied to the hub and the apertures of the hub, wheel and ring align to center the wheel. Another wheel may then be applied to the hub and the apertures thereof aligned with the apertures in the ring to center the second or outer wheel. The plate ring is then placed on the outside of the disk and the apertures aligned with the apertures in the hub, wheel and ring. The hub bolts are preferably fixed in the hubs either by a press fit or made stationary by nut and lock on the inside of the hub. The tapered nuts may then be applied to the bolts for mounting, centering and locking.

Figure 4:
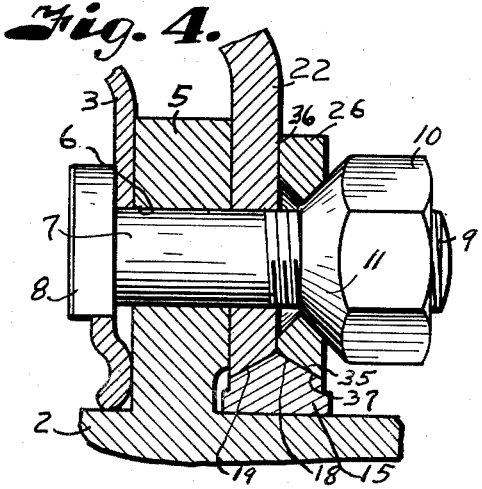
Fig. 4 is a detailed vertical cross section showing a modified form of the invention and particularly adaptable for use in single wheel assemblies.

My invention may be adapted for single wheel assemblies as illustrated in Fig. 4. After the single wheel structure is applied to the hub and the ring also applied thereto, the apertures of the hub, wheel and ring are aligned to center the wheel. The face of the central aperture 27 of the plate ring 26 is beveled as indicated at 35. When applying the plate to a single wheel structure the plate is reversed from the position shown in Fig. 2 and applied to the face of the disk 23 as indicated at 36 and in this position the beveled face 35 of the aperture 27 will contact the beveled face 18 of the split ring 15 as indicated at 37 (Fig. 4), the apertures 28 of the ring plate 26 having their faces beveled forming recesses on either side to receive the tapered portion 11 of the nut 10 when the plate is used in either single or dual wheel assemblies. It is thus obvious that my invention can be adapted to either single or dual wheel assemblies merely by reversing the plate ring 26.

Reversal of the operation of the device as above described may be employed to remove a wheel or plurality of wheels from an automotive vehicle.

It is apparent, therefore, that a convenient, economical and efficient wheel structure has been provided by the present invention in which the wheels are conveniently, economically and efficiently centered and the ring member in load supporting engagement to relieve stresses and strains from the wheel assembly.

What I claim and desire to secure by Letters Patent is:

1. In a wheel structure of the character described, a hub having a flange provided with spaced apertures, a wheel on said hub including a disk provided with apertures aligned with the apertures in the hub flange, the inner face of said disk being beveled and spaced from said hub, a ring on said hub in load supporting engagement with the hub, said ring having its outer circumference beveled forming inner and outer surfaces, the inner surface adapted to engage the beveled face on said disk, a plate engaging said disk and having a beveled edge adapted to engage the outer beveled surface of said ring, said plate having apertures therein aligned with apertures on the hub and disk, and means for connecting said hub, disks and said first named means together.

2. In a wheel structure of the character described, a hub having a flange provided with spaced apertures, a wheel on said hub including a disk provided with apertures aligned with the apertures in the hub flange, the inner face of said disk being beveled and spaced from said hub, a split ring on said hub in load supporting engagement with the hub, said ring being spaced from the flange on said hub and having its outer circumference beveled to engage the beveled face on said disk, a plate engaging said disk and said ring having apertures therein aligned with apertures on the hub and disk, and means for connecting said hub, disks and said first named means together.

3. In a wheel structure of the character described, a hub having a flange provided with spaced apertures, a wheel on said hub including a disk provided with apertures aligned with the apertures in the hub flange, the inner face of said disk being beveled and spaced from said hub, a split ring on said hub in load supporting engagement with the hub, said ring having its outer circumference beveled forming inner and outer bearing surfaces, the inner surface adapted to engage the beveled face on said disk, a plate engaging said disk and having a beveled surface adapted to engage the outer beveled surface of said ring, said plate having apertures therein aligned with apertures on the hub and disk, and means for connecting said hub, disks and plate together.

4. In a wheel structure of the character described, a hub having a flange provided with spaced apertures, wheels mounted on the hub having inner and outer disks provided with apertures aligned with the apertures in the hub flange, a ring on said hub in load supporting engagement with the hub, said ring being spaced from the flange of the hub and having its outer circumference beveled in opposite directions, the inner edges of said disks being beveled to engage the beveled face of said ring, a plate engaging the outer face of the outer disk and having apertures therein aligned with apertures on the hub and disks, and means connecting said hub, disks and plate together.

5. In a wheel structure of the character described, a hub having a flange provided with spaced apertures, wheels mounted on the hub having inner and outer disks provided with apertures aligned with the apertures in the hub flange, a split ring on said hub in load supporting engagement with the hub, said ring being spaced from the flange of the hub and having its outer circumference beveled in opposite directions, the inner edges of said disks being beveled to engage the beveled face of said ring, a plate engaging the outer face of the outer disk and having apertures therein aligned with apertures on the hub and disks, said apertures in said plate being bounded by annular recesses forming conical seats, and bolts having nuts with tapered inner surfaces engaging in said recesses connecting said hub, disks and plate together.

JOHN R. MANNING.

REFERENCES CITED

The following references are of record in the file of this patent:

UNITED STATES PATENTS

| Number | Name | Date |
|---|---|---|
| 1,442,944 | Harvey | Jan. 23, 1923 |
| 1,618,887 | Putnam | Feb. 22, 1927 |
| 1,860,665 | Eksergian | May 31, 1932 |
| 1,969,193 | Woodward | Aug. 7, 1934 |

FOREIGN PATENTS

| Number | Country | Date |
|---|---|---|
| 125,739 | Great Britain | 1919 |